(12) United States Patent
Kamiyama et al.

(10) Patent No.: US 8,418,123 B2
(45) Date of Patent: Apr. 9, 2013

(54) SOFTWARE DEVELOPMENT PRODUCTION MANAGEMENT SYSTEM, COMPUTER PROGRAM, AND RECORDING MEDIUM

(75) Inventors: Shigeru Kamiyama, Tokyo (JP); Yukio Niwano, Tokyo (JP)

(73) Assignee: Jastec Co., Ltd., Tokyo (JP)

( * ) Notice: Subject to any disclaimer, the term of this patent is extended or adjusted under 35 U.S.C. 154(b) by 0 days.

(21) Appl. No.: 12/065,232

(22) PCT Filed: Aug. 31, 2005

(86) PCT No.: PCT/JP2005/016368
§ 371 (c)(1),
(2), (4) Date: Sep. 14, 2009

(87) PCT Pub. No.: WO2007/026435
PCT Pub. Date: Mar. 8, 2007

(65) Prior Publication Data
US 2010/0162200 A1 Jun. 24, 2010

(51) Int. Cl.
*G06F 9/44* (2006.01)
*G06F 7/00* (2006.01)
(52) U.S. Cl. .................... 717/101; 717/120; 707/802
(58) Field of Classification Search .................... None
See application file for complete search history.

(56) References Cited

U.S. PATENT DOCUMENTS

| | | | |
|---|---|---|---|
| 6,581,204 B2 * | 6/2003 | DeBusk et al. | 717/120 |
| 7,669,180 B2 * | 2/2010 | Bassin et al. | 717/101 |
| 7,849,438 B1 * | 12/2010 | Hemmat et al. | 717/102 |
| 7,895,566 B2 * | 2/2011 | Shenfield et al. | 717/107 |
| 7,941,786 B2 * | 5/2011 | Scott et al. | 717/121 |
| 8,006,222 B2 * | 8/2011 | Ruhe | 717/101 |
| 8,024,700 B2 * | 9/2011 | Cantor et al. | 717/120 |
| 8,117,235 B1 * | 2/2012 | Barta | 707/802 |
| 2003/0018952 A1 | 1/2003 | Roetzheim | |
| 2004/0003369 A1 | 1/2004 | Gonos | |
| 2004/0010772 A1 * | 1/2004 | McKenna et al. | 717/101 |
| 2004/0139426 A1 * | 7/2004 | Wu | 717/120 |
| 2004/0143811 A1 * | 7/2004 | Kaelicke et al. | 717/101 |

(Continued)

FOREIGN PATENT DOCUMENTS

| | | |
|---|---|---|
| JP | 2003-263320 | 9/2003 |
| JP | 2004-280295 | 10/2004 |

OTHER PUBLICATIONS

Kristina Risom Jespersen; Applying a Behavioural Simulation for the Collection of Data; [online] 2005; retrieved on Nov. 29, 2012; pp. 1-8; Retrieved from the Internet: < https://docs.google.com/viewer?a=v&q=cache:V7A1tQDPxfAJ:www.ejbrm.com/issue/download.html?>.*

Rachel Menzies et al.; An Adapted Methodology for Contextual Understanding in User-Centred Design; [online] 2010; retrieved on Nov. 29, 2012; pp. 1-2; Retrieved from the Internet: < http://delivery.acm.org/10.1145/2050000/2049603/p273-menzies.pdf?>.*

Joel C. Sercel et al.; The Production Attribute Database (PAD): First of a New Class of Productivity Tools for Product development; [online] 1999; retrieved on Nov. 29, 2012; pp. 1-15; Retrieved from the Internet: < http://ieeexplore.ieee.org/stamp/stamp.jsp?tp=&arnumber=790209>.*

(Continued)

*Primary Examiner* — Thuy Dao
*Assistant Examiner* — Hanh T Bui
(74) *Attorney, Agent, or Firm* — Bachman & LaPointe, P.C.

(57) ABSTRACT

A software development production management system having a processor, which is enhanced in reliability by reducing a different between an evaluation of an actual development and a formed plan. A management database holds both development process component data necessary to model a development process of software and estimation parameter data used to estimate a development plan of the software. The software development production management device compares and evaluates, upon completion of the software development, an actually performed development process and the previously created software development plan, and makes a correction to the estimation parameter data as needed to feed details of the actually conducted software development back to the next development plan.

7 Claims, 7 Drawing Sheets

U.S. PATENT DOCUMENTS

| | | | |
|---|---|---|---|
| 2004/0221256 A1* | 11/2004 | Martin et al. | 717/101 |
| 2006/0168563 A1* | 7/2006 | Muller et al. | 717/120 |
| 2008/0028362 A1* | 1/2008 | Ugai et al. | 717/101 |
| 2009/0031286 A1* | 1/2009 | Yee et al. | 717/120 |
| 2010/0064277 A1* | 3/2010 | Baird et al. | 717/120 |
| 2010/0211515 A1* | 8/2010 | Woodings et al. | 707/802 |
| 2010/0218167 A1* | 8/2010 | Turner et al. | 717/120 |
| 2011/0246911 A1* | 10/2011 | Zeltner | 707/802 |
| 2011/0296371 A1* | 12/2011 | Marella | 717/101 |
| 2011/0302214 A1* | 12/2011 | Frye et al. | 707/802 |
| 2012/0131540 A1* | 5/2012 | Mendis | 717/101 |
| 2012/0204142 A1* | 8/2012 | Rubenstein et al. | 717/101 |

OTHER PUBLICATIONS

Toshiki Mano et al., "Jissen Software Kaihatsu Kogaku Series 8 Mitsumori Hobo", first edition, JUSE Press, Ltd., Dec. 9, 1993, pp. 64 to 87, pp. 133 to 137.

English language Abstracts of JP 2003-263320 and 2004-280295.

Interrnational Search Report dated Nov. 1, 2005.

European Search Report for EP 05781934, dated Nov. 23, 2011.

* cited by examiner

S1 PLAN BASIC INFORMATION DEFINITION

S2 STANDARD DEVELOPMENT PLAN CREATION

S 3 EXECUTION PLAN CREATION

S 4 ACTUAL PERFORMANCE INFORMATION INPUT

S 5  PROJECT-BY-PROJECT FIGURE
     CONSOLIDATION PROCESSING

S 6  DEVELOPMENT UNIT-BY-DEVELOPMENT
     UNIT FIGURE CONSOLIDATION
     PROCESSING

S 7 INDIVIDUALS' PRODUCTIVITY EVALUATION
    CONSOLIDATION PROCESSING

S 8 CONSOLIDATION PROCESSING

SOFTWARE DEVELOPMENT PRODUCTION MANAGEMENT SYSTEM, COMPUTER PROGRAM, AND RECORDING MEDIUM

TECHNICAL FIELD

The present invention relates to a production management system which is used in developing a software product for software product production management (forming a development plan, measuring actual performance and evaluating plan achievement level during development, controlling software product development activities based on evaluation, and accumulating the organization's actual performance in software product development and grasping the rate of improvement in software product development efficiency upon completion of the development).

BACKGROUND OF THE INVENTION

A common way of modeling the process of developing a software product is to use the so-called waterfall model, the premise of which is that works in a downstream process cannot be started until after the specification of its upstream process is established.

Basically, a project plan (defines the creation period of a product created in a development process and a person in charge of the creation) which serves as the basis of production management in software development is created according to the man-hour of work in the respective processes. Examples of how the man-hour is estimated include the function point method (FP method) which determines the scale of software from the software's functions and the COCOMO model which pays attention to the count of source code lines to determine the scale of software (see Non-patent Document 1, for example).

A technique for improving the precision of a project plan has been proposed in which products created in the process of developing software are established, work procedures for creating the products and input products necessary for the work are held, and the man-hour of each product is estimated from its input product (see Patent Document 1).
[Non-Patent Document 1]
 "Software Cost Estimation", Joho Shari (the magazine of Information Processing Society of Japan), Vol. 33, No. 08 (1992)
[Patent Document 1]
 JP 08-202773 A The productivity of software development is measured generally by the scale of the software product and the time required for the development. Conventionally employed measures of the software product scale are the count of source code lines upon completion of the development, function points, the document amount of the software product, and the like. As the time required for the development, the total count of people and the time reported by individual engineers but yet to be validated are collected and employed. In measuring the productivity of software product development where multiple engineers participate, the time put forth by one engineer and the time put forth by another are treated uniformly as having the same value, despite the fact that each individual engineer has different abilities. The actual productivity performance thus contains mixed abilities of individual engineers, which impairs the validity of applying a statistical value derived from past actual performance values to a plan value of the development productivity by way of feedback.

Patent Document 1, in particular, does not mention the development productivity and the premise of the technique disclosed therein is that an accurate estimation value is input for the man-hour required for the development. Furthermore, the validity of comparing the product development productivity between different software projects is not held. It is therefore impossible to compare plan values of the development productivity required for software product development with each other for evaluation of relative merits and to measure the degree of improvement from a comparison with past actual performance values.

Moreover, in actual development, a specification cannot be established fully in an upstream process and starting on work in a downstream process before the specification is established is accordingly unavoidable. In other words, a change in specification is the norm in the process of software development, and the specification change causes the disposal, replacement, and addition of a source code or a product of software development. As a matter of fact, a product developed halfway is often discarded in the process of software product development.

It is usually the scale of a finished software product that is measured as the software product scale, and the measured software product does not contain the scale of a product that has been created during the development but discarded as a result of a specification change (hereinafter referred to as "change net discarded scale"). Since the change net discarded scale is not incorporated in the software production scale despite the fact that the work put forth before the disposal due to the specification change is valid, the actual productivity performance is varied depending on how many times the specification has been changed. In other word, the productivity which is one of process capabilities of software development cannot be measured accurately unless the change net discarded scale is added to the scale of the finished product.

In addition, although a change in specification occurs during development, prior art does not take a specification change during development into consideration, and needs to change the project plan once a specification change occurs. This is one of the factors that lower the precision of the project's process plan.

An object of the present invention is therefore to provide a software development production management system capable of forming as appropriate a software development plan as possible and, if there is a difference between the assessment of actual development and the formed plan, enhancing the reliability progressively by feeding the difference back to data based on which a plan is formed.

According to the present invention, there is provided a software development production management system including: a management database which holds development process component data necessary to model a development process of software, and estimation parameter data used to estimate a development plan of the software; and a software development production management device which defines a software development process to be managed by consulting the development process component data held in the management database, and uses the estimation parameter data to create a software development plan from the defined software development process, in which the software development process, in which the software development production management device has a processing means which, upon completion of the software development, compares and evaluates an actually performed development process and the created software development plan, and makes a correction to the estimation parameter data based on results of the comparison and evaluation so that details of the actually conducted software development can be fed back to a development plan for the next time software is developed.

Further, according to the present invention, in the software development production management system, the software development production management device includes: a standard plan integration module which defines the software development process to be managed based on the development process component data, and then creates a standard software development plan containing scales and man-hours of respective work operations in the defined software development process; an execution plan creating module which assigns the work operations to workers taking into consideration the scales and man-hours of the respective work operations in the standard software development plan, and corrects details of the work operations assigned in accordance with abilities of the respective workers to create an adjusted software development plan; an actual performance information collecting module which, in developing software in accordance with the adjusted software development plan, collects actual performance information containing actual man-hour performance and actual scale performance, the actual man-hour performance being a man-hour that is actually put in by the respective workers, the actual scale performance being a scale of work that is actually done; a process completion monitoring module which, upon completion of the software development, evaluates a difference between details of the actually conducted development and the software development plan created in the execution plan creating module in a manner that includes a cause of the difference and quality of the developed software in the evaluation, and feeds results of the evaluation back to an adjustment made by the execution plan creating module; and an individual productivity evaluating module which evaluates information about productivities of the respective workers taking into consideration the actual man-hour performance and the actual scale performance, and feeds results of the evaluation back to an adjustment made by the execution plan creating module Further, according to the present invention, in the software development production management system, the software development production management device includes an actual production performance evaluating module which performs comparative evaluation between software development plan forming and work according to the formed plan on multiple software development projects to take statistics, and feeds the statistics back to the creation of the standard software development plan in the standard plan integration module While keeping track of the past record of software development is becoming be common in the current software industry, accumulating it as empirical values in preparation for the next development to be reused in creation of a software development plan by way of feedback presents a difficulty in setting a measure of quantification, and therefore has not been realized.

Further, according to the present invention, in the software development production management system, the management database holds, as a productivity empirical value, a labor cost per unit amount of a product, and records a unit labor cost of each employee, and the execution plan creating module calculates productivity of each employee by dividing a product of the productivity empirical value and an actual product amount by the unit labor cost of each employee.

Further, according to the present invention, in the software development production management system, the management database has given development productivity reference data which is a ratio of a given workload to given product amount, the given workload being a workload in a given software development environment, the given product amount being a product amount in the given software development environment, and the execution plan creating module uses a first comparison coefficient and a second comparison coefficient as tailoring parameters, and calculates development productivity reference data in software development for which a plan is to be formed by an expression "given development productivity reference data×second comparison coefficient/first comparison coefficient", the first comparison coefficient being a ratio of a product amount in an environment of the software development for which a plan is to be formed to the given product amount, the second comparison coefficient being a ratio of a workload in the environment of the software development for which a plan is to be formed to the given workload.

In the current software industry, there are no integrated measures and, although empirical values of the productivities of very similar software development projects are accumulated to be reused, reusing empirical values in software development of different characteristics is not practiced.

Further, according to the present invention, in the software development production management system, the management database holds a productivity fluctuation rate which takes into account factors influencing a software development productivity, and the execution plan creating module calculates a development productivity in the software development for which a plan is to be formed from the development productivity reference data and the productivity fluctuation rate.

Further, according to the present invention, in the software development production management system, the execution plan creating module keeps track of each specification change made to a software product in terms of a specification change time which is when the specification change is thought to occur, a change added scale which is an amount added due to the specification change, and a change discarded scale which is an amount discarded due to the specification change, and the change added scale is added to an initial scale and the change discarded scale is subtracted from the initial scale each time the specification change time arrives to calculate an ultimately realized scale which is a scale the software product will have upon completion, the initial scale being a software product scale that is created in the standard plan integration module.

Further, according to the present invention, in the software development production management system, the management database holds a standard rate for each work operation, the standard rate being an expected value of a labor cost in relation to a unit time of a group of standard workers, and the execution plan creating module calculates for each work operation a development labor cost required for the software development with respect to work operations of the respective workers, and divides the development labor cost by the standard rate to calculate a work time of the work in question.

Further, according to the present invention, in the software development production management system, the management database holds for each worker an ability rank of each worker as an attribute, and holds for each rank a skill coefficient, which is based on how long it takes for a worker of this rank to master a work operation, and, when a worker is assigned to a work operation, the execution plan creating module calculates a time required for the assigned worker to finish the work operation from the rank of the assigned worker and the skill coefficient of this work operation.

Further, according to the present invention, in the software development production management system, the individual productivity evaluating module updates the ranks of the respective workers based on actually conducted work operations.

Further, according to the present invention, in the software development production management system, the process completion monitoring module calculates a scale of actually developed software by adding a change net discarded scale to a final scale of the software, evaluates actual work based on the calculated scale of the software, makes a result of the evaluation reflected on the estimation parameter data, and/or obtains intermediate development productivity reference data from an actual development productivity and an actual productivity fluctuation rate, the change net discarded scale being a discarded amount of an already developed part which is discarded due to a specification change in a process of software development, the actual development productivity being a development productivity in the actually conducted software development, the actual productivity fluctuation rate being set taking into consideration a factor unique to this software development that has actually influenced the actual development productivity, and the process completion monitoring module uses the first comparison coefficient and the second comparison coefficient, which are set upon planning, to automatically remove a correction made due to an environment of this software development from the intermediate development productivity reference data, thereby obtaining more general development productivity reference data and enhancing accuracy of the given development productivity reference data.

Also, according to the present invention, a computer program and recording medium for causing a computer to operate as a software development production management system are obtained.

The computer program builds, when read and executed by a computer with a storage device, builds in the storage device a management database for holding development process component data necessary to model a development process of software, and estimation parameter data used to estimate a development plan of the software, and causes the computer to operate as a software development production management device, the software development production management device defining a software development process to be managed by consulting the development process component data held in the management database, and using the estimation parameter data to create a software development plan from the defined software development process. The computer program forms in the computer a processing means which, upon completion of the software development, compares and evaluates an actually performed development process and the created software development plan, and makes a correction to the estimation parameter data based on results of the comparison and evaluation so that the computer can feed details of the actually conducted software development back to a development plan for the next time software is developed. Further, the recording medium is a computer-readable recording medium which records the computer program described above.

According to the present invention, a development plan is formed based on given information and the given information can be updated with information obtained through actual development. The precision of a formed plan is therefore enhanced by repeatedly performing software development production management.

Also, according to the present invention, evaluation of actual development takes into account the work that does not appear in the actual development result due to a specification change which has taken place in the process of development. The precision of evaluating actual development is therefore enhanced and the precision of a plan subsequently formed based on the evaluation is accordingly improved.

Also, according to the present invention, evaluation of actual development takes into consideration matters that are unique to the environment of the development and influence the development in a manner that removes the influence. A more universal evaluation is thus obtained based on actual development, and the precision of a subsequently formed plan is enhanced as a result.

Furthermore, according to the present invention, the abilities of workers assigned to the respective work operations are also taken into account in calculating the productivities of the respective work operations upon planning, and a plan truer to the reality is thus obtained.

BEST MODE FOR CARRYING OUT THE INVENTION

A software development production management system according to an embodiment of the present invention is described below in detail with reference to the drawings.

Figure 1:
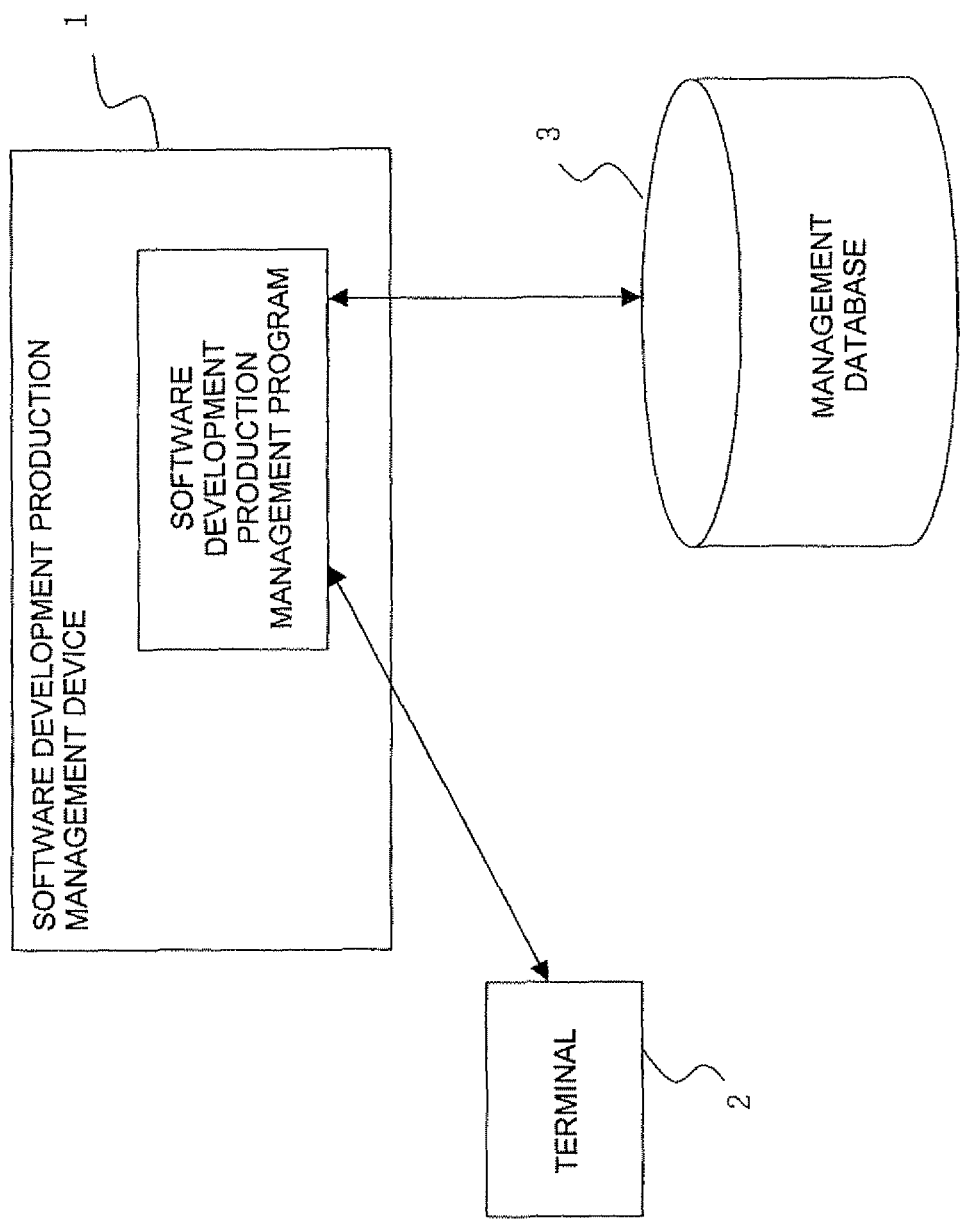
FIG. 1 is a diagram showing the schematic configuration of a software development production management system according to an embodiment of the present invention.

As shown in FIG. 1, the software development production management system according to this embodiment has a software development production management device 1, a terminal 2, which is connected to the software development production management device 1 to serve as a tool of dialogue between a user and the software development production management device 1, and a management database 3, which stores management information of software development.

Figure 2:
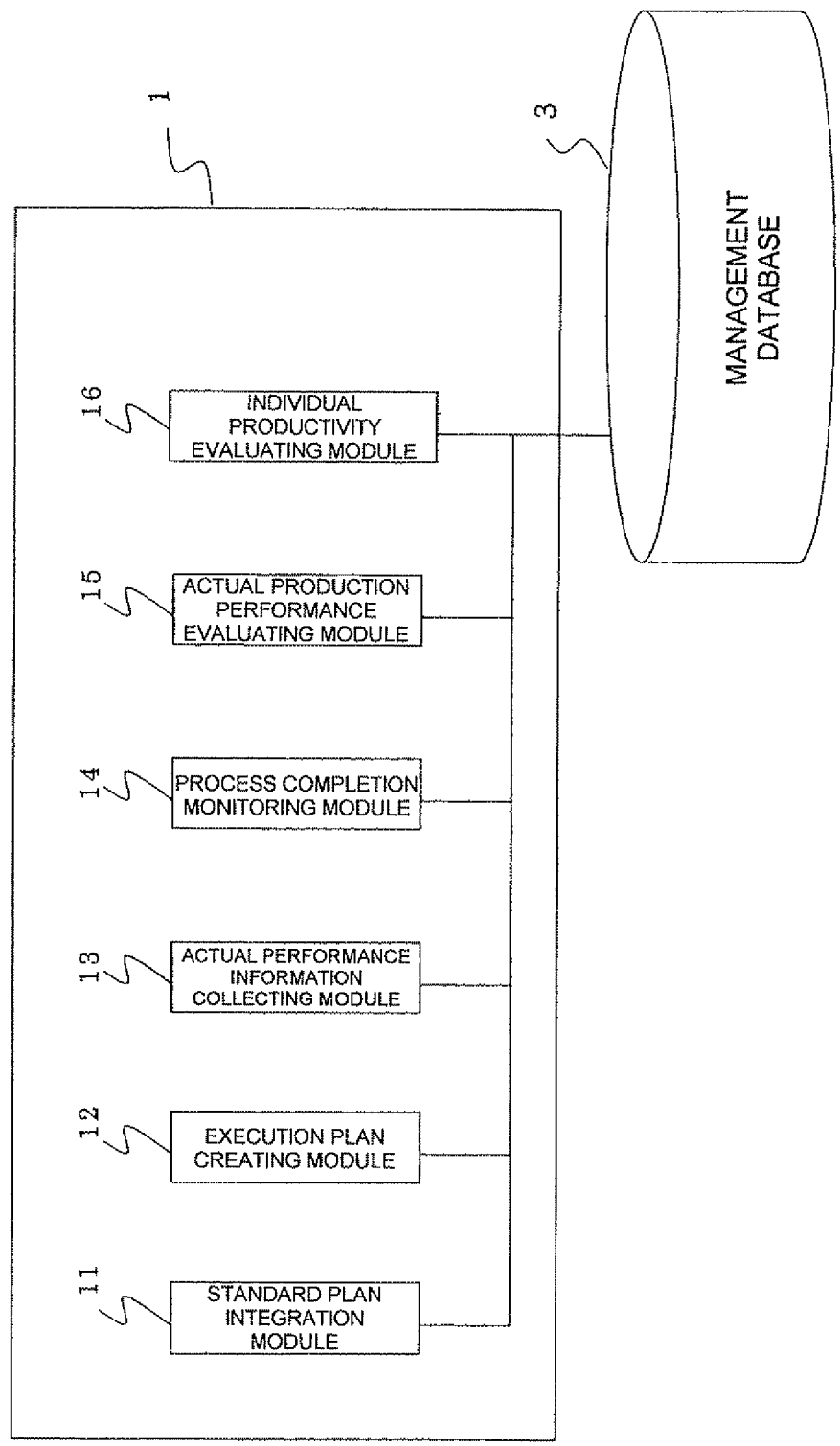
FIG. 2 is a function block diagram showing the functional configuration of a software development production management device which is shown in FIG. 1.

More specifically, the software development production management device 1 is a computer having a CPU and a storage device. The CPU executes a computer program read out of the storage device, namely, a software development production management program, thereby building the management database 3 in the storage device and forming in the computer a standard plan integration module 11, an execution plan creating module 12, an actual performance information collecting module 13, a process completion monitoring module 14, an actual production performance evaluating module 15, an individual productivity evaluating module 16, and a function as processing means for controlling the behavior of these modules as shown in FIG. 2. The software development production management program is recorded in a computer-readable format in a portable recording medium such as a CD-ROM or a DVD-RAM, and installed in the storage device when the time to use the program arises.

Registered in the management database 3 are various types of data necessary for forming and defining a software product development plan, conversion data for canceling out the uniqueness of each software product and absorbing the difference in ability or other aspects among engineers who actually participate in the development to thereby present a more unified view of software product development, and other data. When accessed by the software development production management device 1, the management database 3 provides the registered data and performs update processing on the registered data. Specific data and contents registered in the management database 3 will be described later.

Figure 3:
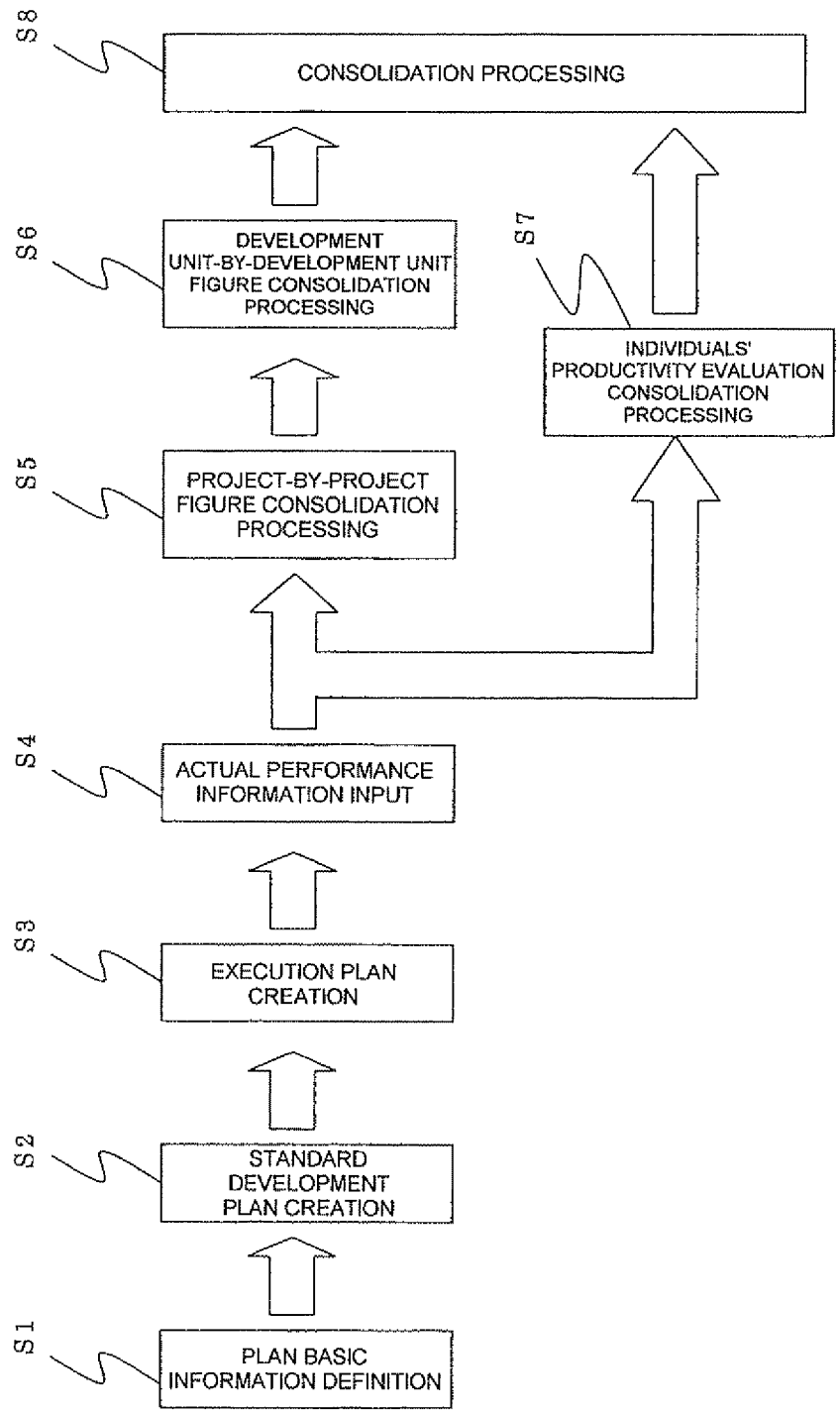
FIG. 3 is a diagram showing the flow of processing by a software development production management program which is shown in FIG. 1.

FIG. 3 shows the flow of processing by the software development production management program according to this embodiment. What follows is a description on the association relation between this flow and the function block diagram shown in FIG. 2.

The standard plan integration module 11 performs plan basic information definition (Step S1) and standard development plan creation (Step S2) in FIG. 3. The execution plan creating module 12 performs execution plan creation (Step S3). The actual performance information collecting module 13 performs actual performance information input (Step S4), and the process completion monitoring module 14 performs project-by-project figure aggregation processing (Step S5). The actual production performance evaluating module 15 performs development unit-by-development unit figure aggregation processing (Step S6), and the individual productivity evaluating module 16 performs individuals' productivity evaluation aggregation processing (Step S7). The respective processing will be described below in more detail.

Figure 4:
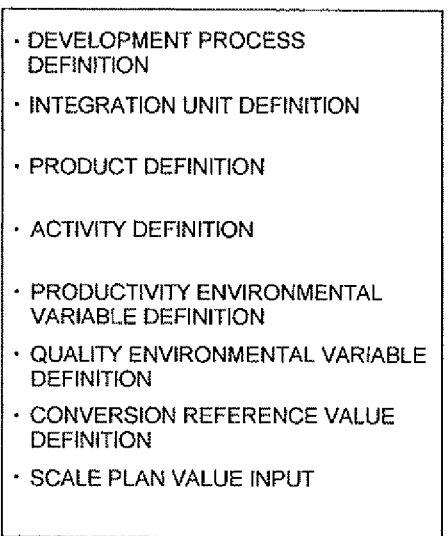
FIG. 4 is a diagram showing processing in Step S1 of the processing flow shown in FIG. 3.

The "plan basic information definition" in this embodiment is composed of, as shown in FIG. 4, 1) defining project development processes ("development process definition"), 2) defining an integration unit ("integration unit definition"), 3) defining a product to be created ("product definition"), 4) selecting or defining activities which specifically show work operations carried out to create the product ("activity definition"), 5) defining an environmental variable for the productivity which influences the productivity of software development ("productivity environmental variable definition"), 6) defining an environmental variable for the software product quality which influences the productivity of software development ("quality environmental variable definition"), 7) defining a conversion reference value for converting empirical values of software development ("conversion reference value definition"), and 8) inputting a scale plan value of the product to be created ("scale plan value input").

(a) Description of the "Development Process Definition"

Typical software development processes include five phases, in order from the upstream (the upper part of the flow), basic designing, package designing, program creation, integrated test, and system test. All or some of these five phases are executed depending on, for example, whether the software to be developed is developed initially or developed to have an additional function.

In the software development production management program according to this embodiment, these typical development processes are prepared in advance as options, and the user can choose and specify a start process or an end process from among the options on the display screen. The user can thus easily specify an appropriate start process and end process for each development system to be managed.

(b) Description of the "Integration Unit Definition"

A software product to be developed is usually composed of multiple software components such as one that performs batch processing and one that performs online processing. These software components do not always have the same development productivity, and it is necessary in integrating a software development plan to classify the components appropriately by productivity based on the development method and development language used so that the overall plan value is figured out by counting up the total in each classification category and then integrating. Classifying appropriately in preparation for this counting up and integration is the integration unit definition discussed here.

(c) Description of the "Product Definition"

A product is naturally created as a result of the work operations of the development processes described above. In this embodiment, typical products created in the development processes are prepared in advance as options, and the user can define a product of each development process by choosing from among the options. This embodiment is structured such that the user can change the name of a product in consideration for cases where the user desires to define a product whose name matches none of prepared names (for example, cases where a client's request makes the use of a specific name preferable).

(d) Description of the "Activity Definition"

An activity in this embodiment refers to a work item executed to create a product as the one described above in each development process such as basic designing and package designing. In this embodiment, work items relevant to the creation of each individual product are sorted into two ranks; work items relevant to the creation of each product are roughly sorted into primary activities and work items sorted into each primary activity are called secondary activities. Some work items in effect need only one rank and, in that case, it is considered that the same work item belongs to the primary activity and the secondary activity.

This embodiment prepares typical primary activities and secondary activities to be selected on the screen, and also allows the user to freely set work items unique to the software product to be developed on both the primary activity level and the secondary activity level, thereby providing a flexibility better fit to the reality.

(e) Description of the "Productivity Environmental Variable Definition"

In creating a software development plan, empirical values based on the past actual development performance are usually employed as the productivity of software product development. However, the development productivity can be varied by various factors, and the adjustment of the development productivity needs to take the variation into consideration. In this embodiment, factors that make the development productivity vary are sorted into one due to the quality level required of the software product (referred to as "quality environmental variable") and the rest (referred to as "productivity environmental variable"), which are defined separately.

Productivity environmental variables are defined by defining factors into two ranks, such as productivity characteristic and secondary productivity characteristic, and determining the influence level of each factor in accordance with a characteristic level judgment standard. The characteristic level judgment standard organizes possible changes into levels for each factor and holds a specific amount of change in association with each level.

(f) Description of the "Quality Environmental Variable Definition"

Factors sorted as quality environmental variables, too, are defined into two ranks, such as quality characteristic and secondary quality characteristic, and a required quality level is determined for each factor in accordance with a required level judgment standard. The required level judgment standard organizes possible changes into levels for each factor and holds a specific amount of change in association with each level.

(g) Description of the "Conversion Reference Value Definition"

It is empirically known that the development productivity and the product scale in software development can be varied by various factors. For instance, the productivity and what is written in a product differ between a software product that controls a plant and a software product that handles clerical work such as accounting procedures. With conventional methods where such differences among software products are not taken into consideration, an appropriate plan cannot be formed unless based on information about a similar software product. This embodiment unifies empirical values of the productivity of software development in order to compare individual software product development projects for relative merits.

To elaborate, empirical values of the development productivity of software development are unified by determining a standard for empirical values of the development productivity of software development (referred to as "cost index standard"). Furthermore, a conversion between the cost index standard and individual software products is accomplished by setting a conversion reference value for conversion between the unified empirical value and values applied to individual software products.

Once a value is registered as the conversion reference value for conversion between the unified empirical value and individual software products, the value can be reused.

The cost index standard is not an absolute standard but a relative standard. For example, a software product group in the maximum frequency zone of an organization that employs the software development production management system according to this embodiment can be set as the standard.

The conversion uses the conversion reference value for two purposes.

One is to unify the actual development performance of respective products of software development into the actual development performance of a representative product. For instance, a representative product common in software development is a source code, and a unified scale is obtained by giving the scale of the source code (in this embodiment, the line count of the source code) as 1 and expressing the scale of each product as a ratio to the source code scale.

The other purpose is to convert a development productivity empirical value for the cost index standard which is kept by the software development production management system into productivities to be applied to the development of individual software products. The product scale (letter count and page count) of an individual software product is varied depending on the format of the specification of the software product, the level of description, and the like. The work amount (time) required to create the product, on the other hand, is varied depending on what tools are used, how many items and how deeply the items are contemplated in order to determine the specification, and the like. Since it is empirically known that there is no guarantee that a change in product scale and a change in work amount required to create the product are in proportion to each other, this embodiment employs a method in which a change in product scale with respect to the cost index standard and a change in work amount with respect to the cost index standard are evaluated independently of each other to convert the productivity. The productivity is calculated by dividing the work amount by the product scale. When the ratio of the work amount to the cost index standard is given as α and the ratio of the product scale to the cost index standard is given as β, the productivity is converted by the following Expression (1).

Although the scale measure and productivity of software are correlated with each other, trying to directly solve the problem of how the productivity varies without distinguishing a change in product scale from a change in work amount, which is what is usually done, produces confusion. This device evaluates a change in product scale and a change in work amount independently of each other, and can accordingly convert the productivity without creating confusion.

$$\text{Converted productivity} = (\text{work amount} \times \alpha)/(\text{productivity scale} \times \beta) = (\text{work amount/productivity scale}) \times (\alpha/\beta) = \text{cost index standard productivity empirical value} \times (\alpha/\beta) \quad (1)$$

In this embodiment, an empirical value of the development productivity is kept as a reference value for each product. Multiple activities are associated with a product, and a set of activities is defined with respect to an empirical value of the development productivity. What activity belongs to the set is identified by this software development production management system in advance (the activity is called a standard activity).

A change in work amount is input for each product by specifying the product. For each of multiple activities associated with a product, a workload ratio is kept, which is defined in advance such that the sum of workload ratios of the standard activities is 100%. The user identifies the ratio of the work amount of each activity to the cost index standard on a factor-by-factor basis, such as a change influenced by a change in work sophistication level or in amount of a product to be created, and also identifies whether the change is due to a condition specified by the client ("specified request") or due to the ingenuity and technical capabilities of the developer ("self-effort"). The user inputs the identified work amount ratio and "specified request" or "self-effort". The work amount ratio of a product is calculated by the following Expression (2).

An effort to improve the work somehow is made on a daily basis, but it is very difficult to translate its effect into a quantitative objective value. With this device, an objective value of the productivity is automatically obtained for each product when the developer specifies a sensible change in work amount in relation to the activity.

$$\text{Product work amount ratio} = \Sigma \text{activity workload ratio} \times \text{work amount ratio} \quad (2)$$

The work amount ratio is sorted into "specified request" and "self-effort" in order to measure a rise in development productivity as a result of a work improvement made by the developer's ingenuity and technical capabilities. The product of work amount ratios input separately for the respective factors of requests specified by the client is used as a work amount ratio that is varied by a condition specified by the client, whereas the product of work amount ratios input separately for the respective factors of self-efforts is used as a work amount ratio that is varied by a work improvement made by the developer.

(h) Description of the "Scale Plan Value"

For each product, a development process for initially creating the product is determined uniquely. Products created in the respective development processes of software development go through changes before the system is completed as a result of correction of errors found in tests and changes made to the specification. Specifically, an initial product of a basic design document is created first in the basic designing process, and a part of the basic design document is discarded or a new part is added to the basic design document as a result of a change made to the specification in the package designing process to create a realized product, which serves as a basic design document initial product when the next program creating process is started.

The amount of the realized product is calculated by adding an amount that is put on to the amount of the initial product due to the change and subtracting a scale that is discarded due to the change. The same is repeated as the development progresses to the subsequent development processes, to program creation, integrated test, and system test. In this embodiment, a product scale estimated or realized at the beginning of an arbitrary development process is called an initially expected scale, a scale discarded due to a change made to the specification during a development process is called a change discarded scale, and a scale added due to a specification change is called a change added scale.

Figure 5:
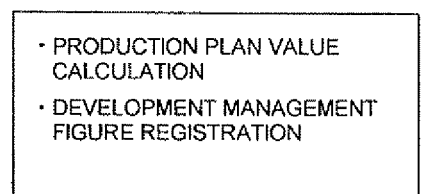
FIG. 5 is a diagram showing processing in Step S2 of the processing flow shown in FIG. 3.

After the "plan basic information definition" is ended, the "standard development plan creation" is carried out as shown in FIG. 3. This "standard development plan creation" includes, as shown in FIG. 5, calculating a production plan value (development man-hour and development labor cost) from a "software development process model", which is held in the management database 3 in advance, and from the plan basic information, which is input and stored in the management database 3 in the preceding "plan basic information definition", and registering a development management coefficient, which is an item of management of the actual software development performance.

(a) Description of the "Software Development Process Model"

The software development process model is an aggregation of information for software development production management that is organized into tables. The table structures and initial values of the respective tables constituting the software development production management model are prepared in advance in the management database 3, and updated when there are inputs from the user in stages of software development production management according to this embodiment, or when otherwise the need arises.

The tables contained in the software development production management model are listed below:

Development Phase TBL

The development phase TBL is a table holding a development phase ID and the name of a development process.

Standard Unit Cost TBL

The standard unit cost TBL is a table holding a standard value for the hourly unit cost of the labor cost of a standard work group which performs a development work operation associated with a product. The standard unit cost TBL may be changed every fiscal year.

Product TBL

The product TBL is a table holding a product ID, a product name, an abbreviated product name, a measure of the product scale (letter count, step count, or the like), and a development phase ID. The development phase ID indicates a development phase in which a product in question is initially created.

Product Productivity Reference Value TBL

The product productivity reference value TBL is a table holding an empirical value of the productivity for each product. The productivity empirical value may be defined every fiscal year so that the organization's overall improvement in productivity is reflected. In the case where productivity empirical values used for creation of a new product and for modification of an existing product are distinguished from each other, the table may hold productivity empirical values sorted into an "initial" category and a "change" category.

Primary Activity TBL

The primary activity TBL is a table holding the ID and name of a first rank activity related to each product.

Secondary Activity TBL

The secondary activity TBL is a table holding the ID and name of a second rank activity related to each product.

Primary Activity Workload Ratio TBL

Each product is associated with multiple first rank activities. This table holds, as a workload ratio, the ratio of work of a first rank activity to the total work amount of a product with which the activity is associated. In light of ever changing work details of software development due to advancement in technology and the like, the table may hold new values every fiscal year.

Secondary Activity Workload Ratio TBL

Each first rank activity is associated with multiple second rank activities. This table holds, as a workload ratio, the ratio of work of a second rank activity to the total work amount of a primary activity with which the second rank activity is associated. The table also identifies a second rank activity that constitutes a productivity empirical value defined in the "product productivity reference value TBL" as belonging to a standard category='S'.

Quality Characteristic TBL

The quality characteristic TBL is a table holding the ID and name of a quality characteristic.

Secondary Quality Characteristic TBL

The secondary quality characteristic TBL is a table holding the ID and name of a secondary quality characteristic and a descriptive note of the secondary quality characteristic.

Quality Characteristic Influence Level TBL

The quality characteristic influence level TBL is a table holding a required level and specific values in the forms of an influence level and a quality characteristic specific value range.

Quality Characteristic Primary Activity TBL

The quality characteristic primary activity TBL is a table holding a first rank activity that is influenced by a secondary quality characteristic and a quality characteristic influence pattern in the forms of a primary activity ID and an environmental variable fluctuation rate pattern ID.

Environmental Variable Fluctuation Rate TBL

The environmental variable fluctuation rate TBL is a table holding a fluctuation rate, which is determined by the required level and the influence pattern, in the forms of an influence level, an environmental variable fluctuation rate pattern ID, and an influence level value.

Productivity Characteristic TBL

The productivity characteristic TBL is a table holding the ID and name of a productivity characteristic.

Secondary Productivity Characteristic TBL

The secondary productivity characteristic TBL is a table holding the ID and name of a secondary productivity characteristic and a descriptive note of the secondary productivity characteristic.

Productivity Characteristic Primary Activity TBL

The productivity characteristic primary activity TBL is a table holding a first rank activity that is influenced by a secondary quality characteristic and a quality characteristic influence pattern in the forms of a primary activity ID and an environmental variable fluctuation rate pattern ID.

Productivity Characteristic Influence Level TBL

The productivity characteristic influence level TBL is a table holding a characteristic level and specific values in the forms of an influence level and a productivity characteristic specific value range.

(b) Description of Information Input in the "Plan Basic Information Definition" Kept in the Management Database 3

Information input in the "plan basic information definition", too, is organized into tables to be stored in the management database 3. The tables of information input in the "plan basic information definition" are listed below:

Development Unit Phase TBL

The development unit phase TBL is a table storing a start process and an end process that are associated with a development unit ID in the forms of a start phase ID and an end phase ID.

Integration Unit TBL

The integration unit TBL is a table storing the ID and name of an integration unit that is defined with respect to a development unit, and a descriptive note of the integration unit.

Integration Unit Phase TBL

The integration unit phase TBL is a table storing, in the form of a development phase ID, a development phase that is a target of integration where an integration unit defined with respect to a development unit is used.

Integration Unit Product TBL

The integration unit product TBL is a table storing, in the form of a product ID, a product created per integration unit that is defined with respect to a development unit for each target development phase.

Integration Unit Primary Activity TBL

The integration unit primary activity TBL is a table registering what first rank activity is performed for a product created per integration unit that is defined with respect to a development phase.

Integration Unit Secondary Activity TBL

The integration unit secondary activity TBL is a table registering what second rank activity is performed for a product created per integration unit that is defined with respect to a development phase. A record for an activity that is added by the user stores an ID, an activity added category, an added activity name, and an added activity workload ratio. The record may also store the IDs of a quality characteristic and a secondary quality characteristic that are added factors.

Integration Unit Analysis Key TBL

The integration unit analysis key TBL is a table storing definitions of an analysis key category ID and an actual performance analysis key ID with respect to an integration unit that is defined with respect to a development unit.

Analysis Key Category TBL

The analysis key category TBL is a table holding the ID and name of a typical analysis key category in advance.

Actual Performance Analysis Key Category TBL

The actual performance analysis key category TBL is a table holding the ID and name of a typical actual performance analysis key in advance.

Quality Characteristic Evaluation Result TBL

The quality characteristic evaluation result TBL is a table storing an influence level for each secondary quality characteristic as an evaluation result of a quality environmental variable of an integration unit that is defined with respect to a development unit.

Productivity Characteristic Evaluation Result TBL

The productivity characteristic evaluation result TBL is a table storing an influence level for each secondary productivity characteristic as an evaluation result of a productivity environmental variable of an integration unit that is defined with respect to a development unit.

Development Unit Cost Index Conversion Standard TBL

The development unit cost index conversion standard TBL is a table storing an application conversion standard table.

Cost Index Application Condition TBL

The cost index application condition TBL is a table storing an application condition.

Scale Adjustment Coefficient TBL

The scale adjustment coefficient TBL is a table storing a field for the sum of scale adjustment coefficients.

Scale Adjustment Coefficient Specifics TBL

The scale adjustment coefficient specifics TBL is a table storing other fields than the field for the sum of scale adjustment coefficients.

Activity-By-Activity Workload Adjustment TBL

The activity-by-activity workload adjustment TBL is a table storing workload adjustment coefficient specifics. An ID for identifying an activity is copied from the integration secondary activity TBL and the secondary activity workload ratio TBL. A "baseline workload ratio" in this table is calculated by the following Expression (3) and stored in the table:

$$\text{Baseline workload ratio} = \text{workload ratio of primary activity workload ratio TBL} \times \text{workload ratio of secondary activity workload ratio TBL} \quad (3)$$

A record for a secondary activity that is added by the user uses the added activity workload ratio of the integration secondary activity TBL instead of the workload ratio of the secondary activity workload ratio TBL.

Scale Plan Value TBL

The scale plan value TBL is a table storing a scale plan value input by the user. In the case where scale plan values are sorted into ones created in-house and ones created by outsourcing, outsource plan values are stored in an outsource scale plan value TBL and in-house plan values are obtained by subtracting the outsource scale plan values which are held in the outsource scale plan value TBL from a total value which is held in the scale plan TBL.

(c) Description of the "Production Plan Value Calculation"

The "production plan value calculation" of the "standard development plan creation" includes 1) calculating a fluctuation rate using activity-by-activity productivity environmental variables, 2) calculating a fluctuation rate using activity-by-activity quality environmental variables, 3) converting productivity empirical values, 4) calculating the development man-hour, 5) calculating the development labor cost, and 6) counting up product-by-product plan values, which are executed in the order stated. A production plan value is thus calculated, and the calculation result is stored in the above-described integration secondary activity productivity TBL, a product-by-product productivity TBL, and an estimation value list TBL.

1) Description of the Fluctuation Rate Calculation Using Activity-by-Activity Productivity Environmental Variables First, the baseline workload ratio is read out of the activity-by-activity workload adjustment TBL to be set and stored as the workload ratio in the integration secondary activity productivity TBL. Next, a productivity associated with the product ID in question is read out of the product productivity reference value TBL. A value obtained by multiplying the productivity in a record that is sorted as the "initial" category of the initial/change categories by the baseline workload ratio is set as an initial productivity of the integration secondary activity productivity TBL. A value obtained by multiplying the productivity in a record that is sorted as the "change" category of the initial/change categories by the baseline workload ratio is set as a change application productivity of the integration secondary activity productivity TBL. Next, a development unit, the ID of a primary activity relevant to an integration unit, an environmental variable fluctuation rate pattern ID, and an influence level are read by associating a productivity characteristic ID and a secondary productivity characteristic ID in the productivity characteristic primary activity TBL with a productivity characteristic ID and a secondary productivity characteristic ID in the productivity characteristic evaluation result TBL. Next, the environmental variable fluctuation rate pattern ID and the influence level are used to read an influence level value out of the environmental variable fluctuation rate TBL. Since there are multiple pairs of a productivity characteristic ID and a secondary productivity characteristic ID for each primary activity ID, and an influence level value is held for each of the pairs, the sum of influence level values of all pairs of a productivity characteristic ID and a secondary productivity characteristic ID that are associated with a primary activity is used as a productivity characteristic influence rate of the primary activity. This productivity characteristic influence rate of the primary activity is set and stored as a productivity characteristic influence rate in a record of the integration secondary activity productivity TBL that has the matching primary activity ID.

2) Description of the Fluctuation Rate Calculation Using the Activity-by-Activity Quality Environmental Variable A development unit, the ID of a primary activity relevant to an integration unit, an environmental variable fluctuation rate pattern ID, and an influence level are read by associating a quality characteristic ID and a secondary quality characteristic ID in the quality characteristic primary activity TBL with a quality characteristic ID and a secondary quality characteristic ID in the quality characteristic evaluation result TBL. Next, the environmental variable fluctuation rate pattern ID and the influence level are used to read an influence level value out of the environmental variable fluctuation rate TBL. Since there are multiple pairs of a quality characteristic ID and a secondary quality characteristic ID for each primary activity ID, and an influence level value is held for each of the pairs, the sum of influence level values of all pairs of a quality characteristic ID and a secondary quality characteristic ID that are associated with a primary activity is used as a quality characteristic influence rate of the primary activity. This quality characteristic influence rate of the primary activity is set and stored as a quality characteristic influence rate in a record of the integration secondary activity productivity TBL that has the matching primary activity ID.

3) Description of the Productivity Empirical Value Conversion

Self-effort scale adjustment coefficients and specified request scale adjustment coefficients, which are registered on an integration unit basis and on a product ID basis, are read out of the scale adjustment coefficient TBL. Next, from records of the activity-by-activity workload adjustment TBL that have the same product ID, self-effort workload adjustment coefficients and specified request workload adjustment coefficients are read. Records having the same primary activity ID and the same secondary activity ID are then read out of the integration secondary activity productivity TBL to re-calculate the initial application productivity and the change application productivity as follows. The re-calculated productivities are stored in the integration secondary activity productivity TBL.

Initial application productivity=initial application productivity×(1+productivity characteristic influence rate+quality characteristic influence rate)×self-effort workload adjustment coefficient×specified request workload adjustment coefficient/self-effort scale adjustment coefficient/specified request scale adjustment coefficient Change application productivity=Change application productivity×(1+productivity characteristic influence rate quality characteristic influence rate)×self-effort workload adjustment coefficient× specified request workload adjustment coefficient/self-effort scale adjustment coefficient/specified request scale adjustment coefficient 4) Description of the Development Man-Hour Calculation and the Development Labor Cost Calculation In the integration secondary activity productivity TBL, initial application productivities and change application productivities that have the same system ID~productivity ID are counted up to obtain product-by-product productivities. The calculation results are stored in the product-by-product productivity TBL.

Next, the initially expected scales and the change scales are read out of the outsource scale plan value TBL to calculate the outsource initial man-hour (=outsource initially expected scale×initial productivity of product-by-product productivity TBL) and the outsource change man-hour (=outsource change scale×change productivity of product-by-product productivity TBL). The outsource initial man-hour and the outsource change man-hour are multiplied by a standard per-process-step-time unit cost in the standard unit cost TBL that has the matching product ID, to thereby obtain the labor cost. The calculation results are stored in an outsource production plan value TBL.

Next, the initially expected scales and the change scales are read out of an in-house scale plan value view to calculate the in-house initial man-hour (=in-house initially expected scale×initial productivity of product-by-product productivity TBL) and the in-house change man-hour (=in-house change scale×change productivity of product-by-product productivity TBL). The in-house initial man-hour and the in-house change man-hour are multiplied by a standard per-process-step-time unit cost in the standard unit cost TBL that has the matching product ID, to thereby obtain the labor cost. The calculation results are stored in an in-house production plan value TBL.

Next, the sum of plan values read out of the outsource production plan value TBL and the in-house production plan value TBL is calculated and stored in the estimation value list TBL. The sum is calculated as follows:

Product scale=(outsource initially expected scale+in-house initially expected scale)+(outsource change scale+in-house change scale)−(outhouse discarded scale+in-house discarded scale)

Standard man-hour=(outsource initial man-hour+outsource change man-hour)+(in-house initial man-hour+in-house change man-hour)

Standard labor cost=(outsource initial labor cost+outsource change labor cost)+(in-house initial labor cost+in-house change labor cost)

Productivity=standard man-hour/product scale (d) Description of the Development Management Coefficient Registration in the "Standard Development Plan Creation"

A development management coefficient is an item for comparing a plan value and actual performance value of software development. This embodiment assigns each product multiple measurement items, which are stored as a measurement item TBL in the management database 3. Specifically, the table structure and initial values of the measurement item TBL are registered in the management database 3 in advance, and can be modified at the user's discretion. When the user selects a measurement target item and registers a plan value, the data is stored in the development management coefficient TBL. Data stored in the development management coefficient TBL is printed out as a development management coefficient report and used as objective values of items monitored while the software development is in progress.

Figure 6:
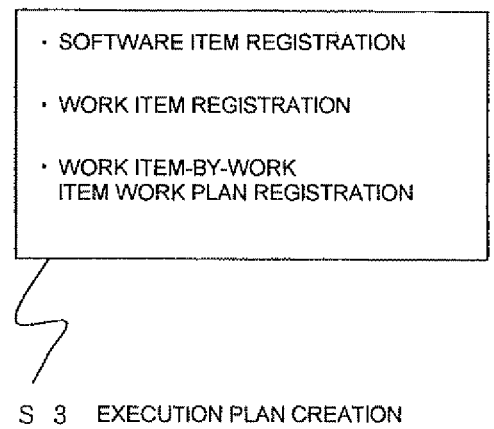
FIG. 6 is a diagram showing processing in Step S3 of the processing flow shown in FIG. 3.

The completion of the "standard development plan creation" is followed by the "execution plan creation" (see FIG. 3). This "execution plan creation" specifically includes, as shown in FIG. 6, "software item" and "work item" registration, and subsequent "work item-by-work item work plan registration".

(a) Description of the "Software Item"

Software items are segmentalized realized functions and the like that are treated as the management unit in managing the configuration of a software product. In software development, usually persons who handle the development, realized functions, and the like are segmentalized in concert with the progress of the processes.

The user registers the integration unit, development processes and, for each product, software items treated as the management unit. Specifically, because a scale plan value has been input for each product in the standard development plan, the user segmentalizes this to input a scale plan value for each software item.

The data input by the user is stored in a software item TBL in the management database 3. Software items which are realized functions are sequentially segmentalized and defined, which makes it possible to discriminate realized functions that have not been segmentalized yet by displaying them as dummies.

(b) Description of the "Work Item"

When the registered software items as the management unit are actually assigned to a person who handles the software development, more than one person may be assigned if the management unit is large. For instance, user interface designing work and database designing work of one realized function are treated as one operation by the realized function, but, in that case, the user interface designing work and the database designing work are usually separated and assigned to different persons. A unit obtained by further segmentalizing management unit work in this manner in order to assign the work to persons who handle software development is a work item.

Management unit development work can be identified on an activity basis since a product is associated with activities. A work item is defined and registered as a set of activities to be assigned to persons who handle development.

The defined and registered work item is stored in a work item management TBL and work item secondary activity TBL of the management database 3. The work item management TBL holds the work item management number and work item name of a work item defined by the user. The work item secondary activity TBL holds the ID of a secondary activity contained in a work item. A list of secondary activities is created from the integration secondary activity TBL, which has been created in the standard development plan creation, and the user selects activities to be included in a work item from the list.

(c) Description of the "Work Item-by-Work Item Work Plan"

The work item-by-work item work plan is a plan that assigns units of work allocation to persons which are registered as work items to actual persons who handle development. The development productivity set in the standard development plan is a mean value based on past empirical values. Since software development experience and ability differ from person to person, when the user assigns work to an actual person, the development productivity has to be modified into one that is fit to the experience and ability of the person.

In this embodiment, the productivity is modified by making a correction as follows. The corrected productivity is stored in a production work management unit TBL of the management database 3.

1) Description of Correction by Salary

In this embodiment, an hourly unit cost which is determined by a salary is set in advance to each person who handles development, and the hourly unit cost is kept in the management database 3 to obtain a development productivity associated with an individual person by the following expression:

Productivity of individual person=(standard development man-hour×standard per-process-step-time unit cost)/individual's hourly unit cost=standard development man-hour×(standard per-process-step-time unit cost/individual's hourly unit cost)

The integration secondary activity productivity TBL created in the standard development plan creation in this embodiment holds a development productivity on a secondary activity basis. This productivity is multiplied by the scale of a software item defined in the software item TBL to obtain the standard development man-hour of each secondary activity. The standard development man-hour calculated for each secondary activity is sorted by work item management number defined in the work item secondary activity TBL, and counted up to obtain the standard man-hour for each work item management number.

2) Description of Correction by Ability

In this embodiment, a coefficient for correcting a person's ability is held for each product as a person-by-person productivity correction coefficient in a personnel-by-personnel productivity correction TBL of the management database 3. The coefficient is the ratio of a per-unit amount price of a product created in the past by a person in question to an average per-unit amount price of the products. This embodiment uses this relative ability coefficient to make a correction such that a value obtained by multiplying an individual person's productivity by the relative ability coefficient is used as the development productivity. The person-by-person productivity correction coefficients stored in the personnel-by-personnel productivity correction coefficient TBL are results of analyzing the actual production performance of individual persons in the individuals' productivity evaluation aggregation processing, which will be described later.

3) Description of Other Corrections

Other corrections include a correction of man-hour that is independent of individual persons' experience and ability, such as acquiring knowledge necessary for software development of a new business operation and redoing the work of a previous step due to an error in a master design document. This type of correction is made by the user directly specifying a corrected man-hour, and the result is stored in a personnel-by-personnel correction man-hour TBL. Another corrected man-hour may be entered after sorted by reason of correction.

Figure 7:
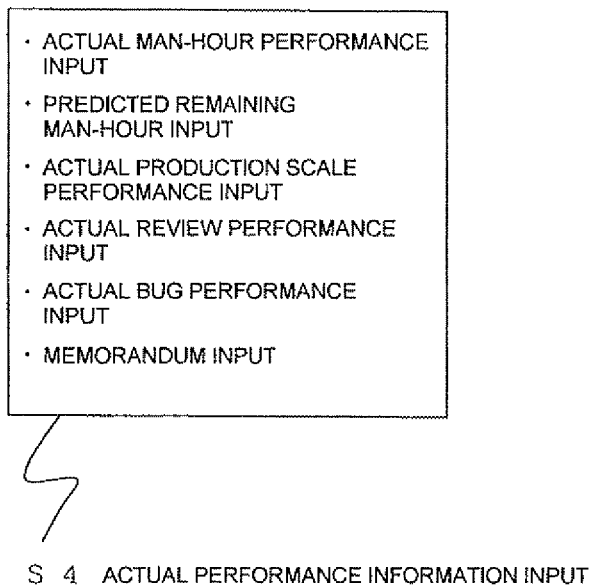
FIG. 7 is a diagram showing processing in Step S4 of the processing flow shown in FIG. 3.

As shown in FIG. 3, the completion of the "execution plan creation" is followed by the "actual performance information input". This "actual performance information input" specifically includes, as shown in FIG. 7, inputting "actual man-hour performance", a "predicted remaining man-hour", "actual production scale performance", "actual review performance", "actual bug performance", and a "memorandum". Once input, these are organized into tables to be stored in the management database 3. What is input as these will be described below.

(a) Description of the "Actual Man-Hour Performance"

In this embodiment, the actual man-hour performance of individual persons can be input on a work item basis and on a secondary activity basis. Specifically, each input screen can be identified by a person's name and a date, and is designed such that the actual man-hour performance can be input on a second rank activity basis on the screen. Data input on the screen is stored as a person-by-person actual man-hour performance TBL in the management database.

The actual man-hour performance input may not be daily performance, but may be weekly or monthly performance, or performance measured in a development phase or other production management cycles determined by the developer organization.

An outsource actual performance registration function or the like is prepared so that the user can input the actual man-hour performance of outsourced work on the screen. The thus input data is stored in an actual outsource man-hour performance TBL.

(b) Description of "Predicted Remaining Man-Hour"

In order to grasp the progress on a work item basis, remaining man-hours and remaining development amount till the completion of work in the work item of each person are entered and the inputs are organized into a table to be stored in a remainder prediction TBL. The inputs make it possible to grasp the man-hour consumption rate and the product creation rate for each work management unit at that point, which can be used in work progress management and enables the overseer to refer at any time to an opinion of a person who handles development about deviation from the planned man-hour.

(c) Description of the "Actual Review Performance"

Actual review performance such as the time spent for review, pointed-out reasons, and the case count is also beneficial information for management of the quality of a software product. Such information is therefore registered as actual review performance in the management database in this embodiment. This registration function is an arbitrary function and may be omitted.

(d) Description of the "Actual Bug Performance"

Information about a found bug such as why the bug has slipped in, which product contains the bug, and the case count is also beneficial for management of the quality of a software product. Such information is therefore registered as actual bug performance in the management database in this embodiment. This registration function is an arbitrary function and may be omitted.

(e) Description of the "Memorandum"

Software development work is theoretically allocated among individual persons by creating an execution plan but, in practice, is cooperative work by multiple persons in most cases. For convenience of explanation, persons assigned to respective work operations are referred to as "instructed persons". In the execution plan, there is one instructed person for one work item. The instructed person performs software development work such as designing and programming on an input product, to thereby create an output product. In the process of conducting software development work, the instructed person asks other people for advice or guidance and, in some cases, argue with other people. The person's work efficiency rises when the advice or guidance is good whereas it drops when the advice or guidance is irrelevant. A person that gives advice to or guides an instructed person is referred to as "instructor". There may be only one instructor, or two or more instructors.

The memorandum is for recording what advice or guidance has been given by an instructor in order to evaluate how much the instructor's advice or guidance has contributed to the work efficiency. The user can input the man-hour spent for the advice and details of the advice on the screen, and the inputs are stored in a memorandum-instructed person TBL and a memorandum-instructor TBL.

Figure 8:
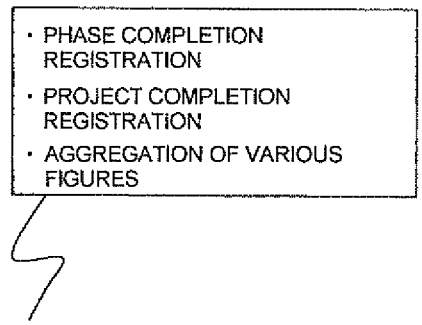
FIG. 8 is a diagram showing processing in Step S5 of the processing flow shown in FIG. 3.
Figure 9:
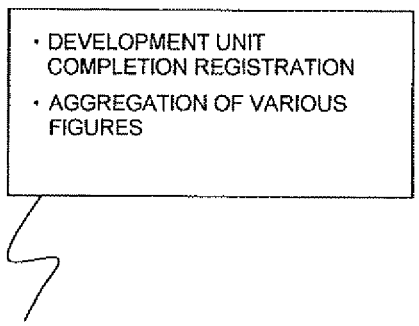
FIG. 9 is a diagram showing processing in Step S6 of the processing flow shown in FIG. 3.

After the "actual performance information input" is ended, the "project-by-project figure aggregation processing" and the "development unit-by-development unit figure aggregation processing" are executed successively (see FIG. 3). The "project-by-project figure aggregation processing" includes, as shown in FIG. 8, registration of "phase completion" and "system development completion (project completion)", and counting up of various figures. The "development unit-by-development unit figure aggregation processing" includes, as shown in FIG. 9, registration of development unit completion and evaluation of a software development process model which is conducted by evaluating the actual production performance.

(a) Description of the "Phase Completion Registration"

The phase completion registration is registration that should be made each time a development process such as basic designing and package designing is finished to record the completion of the process. Specifically, the phase completion registration is accomplished by making "completion date registration" and "actual environmental variable performance registration". In this embodiment, by registering the completion date of a phase, inputting actual work performance after the completion date is prevented and a function is added which registers a result of assessment of development process completion such as an adequacy check self-rated score.

The phase completion registration is followed by "test issue submission coefficient registration". Specifically, processing of aggregating data upon completion of the phase is executed, an item and plan value to be measured are read out of the development management coefficient TBL, which has been created in the standard development plan, and an actual performance value is read out of an actual development management coefficient performance TBL to be displayed on the screen. Based on the displayed data, the user inputs or updates an actual performance value to store or update the actual performance value in the actual development management coefficient performance TBL. Actual performance of a work item or the like that differs from its estimation may be input if the user requests.

1) Description of the "Actual Environmental Variable Performance Registration"

In the "plan basic information definition", information at the time of planning (at the time of estimation) has been input as the "productivity environmental variable definition" and the "quality environmental variable definition". As information corresponding to this information, the factors are re-evaluated upon completion of a development phase and input in the "actual environmental variable performance registration". What is registered in the "actual environmental variable performance registration" is substantially the same as the "productivity environmental variable definition" and the "quality environmental variable definition" in the "plan basic information definition", but reflects the actual performance at the time of completion of the development phase. The information input by the user is stored in an actual productivity characteristic performance evaluation result TBL, an actual quality characteristic performance evaluation result TBL, and an actual scale performance correction TBL.

After these tables are created, the created tables are used to calculate a "productivity characteristic influence rate" and a "quality characteristic influence rate" in a manner similar to the "production plan value calculation" in the "standard development plan creation". Specifically, the "actual productivity characteristic performance evaluation result TBL" is used instead of the "productivity characteristic evaluation result TBL" and the "actual quality characteristic performance evaluation result TBL" is used instead of the "quality characteristic evaluation result TBL" in a calculation similar to the "productivity plan value calculation" in the "standard development plan creation" described above, to thereby calculate the "productivity characteristic influence rate" and the "quality characteristic influence rate". On the screen, a value obtained by {productivity characteristic influence rate+quality environmental characteristic influence rate}×100 is displayed as an influence rate theoretical value. This is the rate of influence to the productivity by the productivity characteristic and the quality characteristic that have been re-evaluated upon completion of the phase, and the user can use the difference between this and the rate of influence to the productivity that has been calculated at the time of planning as an error in productivity characteristic and quality characteristic evaluation. The evaluation error can be used as a chance to improve the method of evaluating the productivity characteristic and the quality characteristic.

2) Description of the "Aggregation Processing upon Phase Completion"

Information other than the one registered in the "actual environmental variable performance registration" described in the above Section 1) includes information that is stored in the "actual performance information input" in the management database 3 as the "person-by-person actual man-hour performance TBL", the "actual production scale performance TBL", the "actual outsource man-hour performance TBL", and an "actual outsource scale performance TBL".

These tables are used when aggregation target items are read out of the measurement item TBL upon request from the user. The respective aggregation target items are read out of the person-by-person actual man-hour performance TBL, the actual production scale performance TBL, the actual outsource man-hour performance TBL, and the actual outsource scale performance TBL to be aggregated. The result of the aggregation is stored in the actual development management coefficient performance TBL. The aggregation result is displayed on the display screen and also printed by a printer. The aggregation result includes a comparison between activities planned to be executed in the software development work and actually executed activities, an aggregation result of software item-by-software item actual product scale performance, the mean value and standard deviation of test densities (the count of test items per source code line), and the like. The mean value and standard deviation of bug densities (the count of errors (bugs) found in a test per source code line) and a result of comparison between a plan value stored in the development management coefficient TBL and an actual performance value stored in the actual development management coefficient performance TBL are also information that can be used for the purpose of prompting improvement of software development work.

As the actual production scale performance, the scale of an actually created document or program source may be measured automatically by reading the document or program source.

(b) Description of the "System Development Completion (Project Completion) Registration"

After the series of phases up through the system test is all finished, a development unit completion date is registered. When the user enters an instruction on a given screen to perform a development completion calculation, the completion date of the final development phase of the development unit is stored as the development unit completion date in a development unit completion TBL.

(c) Description of Information Aggregable through the "Development Unit-by-Development Unit Figure Aggregation Processing"

The management database 3 stores information input in the "phase completion registration" and the "actual performance information input". The stored information receives given aggregation processing before displayed on the screen upon request from the user and, in response to a further request, is printed by a printer. The displayed aggregation result is, for example, a list of differences and disparity rates between plan values and actual performance values that are stored in the development management coefficient TBL and the actual development management coefficient performance TBL, respectively. In this embodiment, the aggregation unit may be a development phase, an integration unit, or a combination of development phases and integration units, and can be specified by the user at his/her discretion.

It is understood from FIG. 3 that the "individual-basis productivity evaluation aggregation processing" is executed in parallel with the "project-by-project figure aggregation processing" and "development unit-by-development unit figure aggregation processing" described above. In other words, the "individual-basis productivity evaluation aggregation processing" is also executed after the "actual performance information input" is finished.

Figure 10:
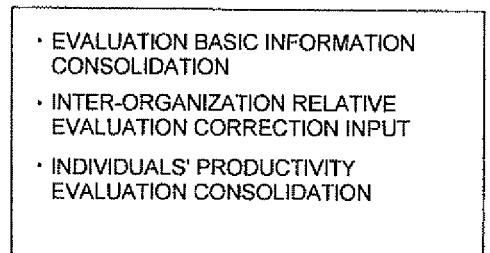
FIG. 10 is a diagram showing processing in Step S7 of the processing flow shown in FIG. 3.

The "individual-basis productivity evaluation aggregation processing" includes, as shown in FIG. 10, "evaluation basic information aggregation", "inter-organization relative evaluation correction input", and "individuals' productivity evaluation aggregation". In the "evaluation basic information aggregation", evaluation basic information is created for each instructor and each instructed person, and a list for adjustment within a team is output. Next, adjustments are made sequentially from the lower echelon of the organization to the upper echelon so that an adjustment within the software development project team is made first, then an adjustment within the section, and then an adjustment within the department. The adjustment results are made into an adjustment result list. A difference between organizations is adjusted by the "inter-organization relative evaluation correction input". The adjustment result list is a ranking list of individuals' product-by-product productivities. Results of the company-wide adjustment are stored in the personnel-by-personnel productivity correction TBL. This personnel-by-personnel productivity correction TBL is consulted in the future when an execution plan is created in development production management of another software product in order to correct differences in ability among individuals. Therefore, according to this embodiment, differences in ability among individuals can be reflected on a plan based on the past record of development, which makes it possible to raise the precision of a plan progressively and to reflect an improvement in ability of individual persons on the plan as seen fit.

In the "individuals' productivity evaluation aggregation" processing executed next, an individual-basis ranking list is created by compiling the instructor ranking list and the instructed person ranking list. A certain reference line is set to section this ranking list so that the user can determine individuals' ratings in regard to software development productivity, and the ranking list can be used as reference information in personnel review of persons who handle software development.

(a) Description of the "Evaluation Basic Information Aggregation"

The evaluation basic information aggregation is composed of "software item completion input", "basic data additional input", and "reducing effect registration".

1) Description of the "Software Item Completion Input"

On the screen, the user checks each software item for its completed section and gives an instruction to save, causing the completed section to be stored in a software item completed section TBL. At the time an individual's productivity is evaluated, some software items are being worked on whereas other software items have been completed. The software item completion input is for evaluating the productivity by using the actual performance value for a completed software item and using the plan value created in the execution plan for a software item that is being worked on.

In this embodiment, the actual performance value of the man-hour and the plan value of the man-hour are read out of the person-by-person actual man-hour performance TBL and the production work management unit TBL, respectively, to create a record in an evaluation target man-hour TBL. Also, the actual performance value of the scale and the plan value of the scale are read out of the actual production scale performance TBL and the production work management unit TBL, respectively, to create a record in an evaluation target scale TBL.

2) Description of Additional Input of Evaluation Basic Information

While the information input in the "work item-by-work item work plan" may be used as evaluation basic information, this embodiment also provides a way for the user to additionally input evaluation basic information. Specifically, the actual man-hour performance of instructors and the actual man-hour performance of instructed persons are counted up on a work item basis to be displayed in actual man-hour performance fields, and corrected man-hour breakdown fields are provided in association with the actual man-hour performance fields. The user enters information in the corrected man-hour breakdown fields and the information is stored in a correction-accommodating man-hour TBL. The information input by the user is listed below:

Skill Correction Man-Hour

The skill correction man-hour is the man-hour necessary for compensating for a person's lack of skill in work in question (for example, necessary for learning a work procedure or applied technique of a development process that the person experiences for the first time). For fair evaluation of individual persons' productivities, a correction is made by subtracting the skill correction man-hour from the person's actual work man-hour performance.

Contrivance Effect Correction Man-Hour

The contrivance effect correction man-hour is the man-hour that can be reduced in work in question owing to an idea thought up of by another person who is handling the software development. Since the credit of reducing the work man-hour goes to the other person and not the person in question, a correction is made by adding the contrivance effect correction man-hour to the actual work man-hour performance of the person in question.

Difficulty Level Correction Man-Hour

The difficulty level correction man-hour is the man-hour added due to a high difficulty level unique to a software item assigned to a person. For fair evaluation of individual persons' productivities, a correction is made by subtracting the difficulty level correction man-hour from the person's actual work man-hour performance.

Change-Accommodating Correction Man-Hour

The change-accommodating correction man-hour is the man-hour for redoing a previous step due to a change in specification. For fair evaluation of individual persons' productivities, a correction is made by subtracting the change-accommodating correction man-hour from the person's actual work man-hour performance.

Problem-Accommodating Correction Man-Hour

The problem-accommodating correction man-hour is the man-hour for redoing a previous step to rectify an error in a superordinate product that is created by not the person in question but another person who is handling the software development. For fair evaluation of individual persons' productivities, a correction is made by subtracting the problem-accommodating correction man-hour from the person's actual work man-hour performance.

When such information is input, the evaluation target man-hour is calculated by the following expression to be stored in a calculation result TBL. The actual man-hour performance is read out of the person-by-person actual man-hour performance TBL.

$$\text{Post-correction evaluation target man-hour} = \text{actual man-hour performance} - \text{skill correction man-hour} + \text{contrivance effect correction man-hour} - \text{difficulty level correction man-hour} - \text{change-accommodating correction man-hour} - \text{problem-accommodating correction man-hour}$$

An instructed person cost is obtained by multiplying the post-correction evaluation target man-hour by an hourly unit cost, which is read out of an individual-by-individual hourly cost TBL. The instructed person cost is divided by an evaluation target scale, which is read out of the evaluation target scale TBL.

3) Description of the Reducing Effect Registration

The reducing effect registration is to input an assessed effect of advice given by an instructor which is assessed based on the memorandum entered in the actual performance information input. Registered data is read out of the memorandum-instructor TBL and the memorandum-instructed person TBL to be displayed in the form of a list on the display screen upon request from the user. The user sections a range between −10% and +100% at 10% intervals, and inputs one of the levels "−1~10" as an effect level, which is the degree of reduction in a work man-hour owing to advice, to assess the effect of the advice. Specifically, when an effect level is input, values for ranking instructors and instructed persons are calculated based on the input effect level.

α) Value for Ranking Instructors

Instructors are ranked in descending order of value obtained by dividing an effect amount in money by a cost that is put in as an instructor (hereinafter referred to as "effect rate").

The effect amount in money is a reduced cost halved between an instructor and an instructed person. The reduced cost refers to a cost cut owing to the instructor's instruction, and is an amount of money calculated by subtracting the instructed person's cost that has actually been required from the instructed person's cost that would have been required if the instructor has not given the advice (hereinafter referred to as a predicted input cost). The reduced cost is halved between the instructor and the instructed person because it is considered that eliciting more effective advice, too, is an individual's ability. The degree of reduction in a work man-hour as a result of giving advice is stored as the effect level. The unit of effect level is 10%. Accordingly, the ratio of the man-hour that is considered to be reduced owing to the advice is calculated by "1−effect level/10". The actually worked man-hour is a reduced man-hour that has been reduced as a result of receiving the advice, and the work man-hour that would have been required if the instructor has not given the advice is calculated by dividing the actual work man-hour by (1−effect level/10). The cost is calculated by multiplying the workman-hour by an individual's hourly unit cost, and a predicted input cost is calculated by the following expression. An instructed person's cost is the amount of money calculated by multiplying the post-correction evaluation target man-hour by the individual's per-hour cost, and has been corrected using the result of additional input of the evaluation basic information.

Predicted input cost=(instructed person's cost+instructor's cost)/(1−effect level/10)

The reduced cost is obtained as follows:

Reduced cost=predicted input cost−(instructor's cost+instructed person's cost)

The above expressions cannot be used when the effect level is 10, in other words, when the degree of reduction is 100%. In this case, the amount of money calculated by multiplying the actual average cost performance per unit amount of product by the product amount is treated as the reduced cost.

The effect amount in money is calculated as follows:

Effect amount in money=reduced cost/2

β) Value for Ranking Instructed Persons

Instructed persons are basically ranked by cost per unit product amount (hereinafter referred to as "individual's productivity"). However, this ranking method cannot be used as it is since the development productivity of software development is varied by a difference between systems to be developed and a difference in integration unit even when the same product is created. For that reason, the mean value of per-unit product amount costs (hereinafter referred to as average productivity) is calculated under the condition that the same development system and the same integration unit are used to create the same product. A value obtained by dividing the per-unit product amount cost of a product that is created by an individual by the average productivity (hereinafter referred to as individual's relative productivity) is used for the ranking. The individual's relative productivity indicates how far an individual's productivity is from the average. When the individual's relative productivity is smaller than 1, it means that the individual is creating a product cheaper than average and, when larger than 1, it means that the individual is creating a product that is more costly than average. Instructed persons are therefore ranked in ascending order of individual's relative productivity.

Individual's productivity=(instructed person's cost+instructor's cost+reduced cost/2)/product amount Individual's relative productivity=individual's productivity/average productivity An instructed person together with an instructor handles an activity which is a part of work of outputting a specific process product, namely, a software item. It is not practical to directly measure the scale of a product output by the activity that is assigned to the person, of the specific process product, namely, the software item to be output, in light of cost required for the measurement. This embodiment therefore uses as the product amount a logical product scale obtained as follows. The scale of an actual process product (software item) is prorated in accordance with the workload ratio of a secondary activity, which has been stored in the integration secondary activity productivity TBL when creating the standard development plan. The logical scale of a product associated with this activity is thus obtained. The scale of the actual process product (software item) is stored in the actual production scale performance TBL, and a scale calculated by "ultimately realized scale−start-up scale+net scale" is used.

(b) Description of "Inter-Organization Relative Evaluation Correction Input"

The contribution rates of instructors and the individuals' productivities of instructed persons are aggregated on a product basis and on a person-by-person basis to create a ranking list.

The ranking list shows relative ranks among the members of the project team, the section, and the department. As the matrix is expanded from the project team to the section and from the section to the department, uneven distribution of members must be corrected. This embodiment allows the user to input a correction coefficient to correct the uneven distribution on the screen. The result of the input is stored in the development unit-by-development unit productivity TBL, a section-by-section productivity TBL, a department-by-department productivity TBL, and a company-wide productivity TBL. After inputting the correction coefficient, the user causes the result of the adjustment to be output, checks the adjustment result, and ends the adjustment between organizations. This is repeated until the adjustment is completed company-wide.

In this embodiment, where the user is allowed to input a correction coefficient to correct the uneven distribution of members on the screen, the correction may be made automatically by registering a correction coefficient in advance. The assumption of this is that a stage where the correction method and the correction standard are satisfactorily stable is reached before automating the operation by advance registration.

α) Aggregation of Contribution Rates of Instructors

A post-correction contribution amount in money is calculated by multiplying the contribution amount in money by a correction coefficient that the user inputs. In the case where the user does not specify a correction coefficient, 1.0 is used as the correction coefficient. Next, instructors' post-correction contribution amounts in money and instructors' input costs are counted up for each person who handles the software development and for each product on an integration unit basis. A contribution rate is obtained by dividing the tallied-up individuals' contribution amounts in money by the tallied-up individual instructors' input costs.

β) Aggregation of Individuals' Relative Productivities of Instructed Persons

Individuals' productivities of instructed persons are aggregated on the premise that any combination of a development system and an integration unit produces the same value as the average productivity. In other words, a correction coefficient input by the user is used as a value that determines the relative values of the average productivity produced by one development system and one integration unit and of the average productivity produced by a different development system and a different integration unit. Individuals' relative productivities are corrected with the correction coefficient as follows:

Post-correction individuals' relative productivities=individuals' productivities/(average productivity×correction coefficient)=individuals' relative productivities/correction coefficient After the post-correction individuals' relative productivities are obtained, the individuals' productivities of instructed persons are aggregated in the following manner. When no correction coefficient is set, 1.0 is used as the correction coefficient. Post-correction individuals' relative productivities×product amounts and product amounts are counted up. The tallied-up post-correction individuals' relative productivities×product amounts is divided by the tallied-up product amounts to obtain the individuals' relative productivities.

(c) Description of "Individuals' Productivity Evaluation Aggregation Processing"

Up to this point, the product-by-product ranking lists for instructors and for instructed persons have been created. In this embodiment, a contribution amount in money is calculated by the following expression to create an individual-basis ranking list. The instructors' contribution amounts in money are the tallied-up value of the post-correction contribution amounts in money which have been ultimately corrected through the inter-organization relative evaluation correction input. The company-wide productivity TBL is read to count up the read data for each employee number, and the result is stored in an individual-basis evaluation compiling TBL. An instructed person's contribution amount in money is defined as a development cost at which the instructed person has succeeded in creating a product cheaper than the mean value of per-unit amount costs of the products. Each person handling software development may work as an instructor in some stages while working as an instructed person in other stages. Therefore, an added value rate is calculated by the following expression and the persons are sorted in descending order of added value rate, thus creating an individual-basis ranking list.

Added value rate=(Contribution amount in money as instructor+contribution amount in money as instructed person)/(cost as instructor+cost as instructed person)

After the "development unit-by-development unit figure aggregation processing" and the "individual-basis productivity evaluation aggregation processing" are ended, "aggregation processing" is executed subsequently. This "aggregation processing" is specifically composed of "actual production performance aggregation processing" and "plan reference value update".

(a) Description of "Actual Production Performance Aggregation Processing"

Actual performance information aggregated upon completion of a phase and actual performance information aggregated upon completion of a project are stored in the management database 3 by the project-by-project figure aggregation processing and the development unit-by-development unit figure aggregation processing.

The actual production performance aggregation processing includes 1) index value calculation through which actual cost index performance information is stored in the management database 3 and 2) index value reference through which an analysis result is output. The index value calculation processing is executed upon request from the user and the result of the processing is stored in the actual cost index performance information of the management database 3.

In this embodiment, the user can specify through the display how reference information is output by specifying an index value category, a cycle, and a comparison method. Information that can be referred to is classified into index value category, cycle, and comparison method. Index values actually referred to are sorted into two ranks, primary index values and secondary index values. Examples of the analysis result include a fiscal year-basis comparison table, a matrix-basis ranking table, an improvement rate ranking table, and a graph showing the relation between measurement items. The fiscal year-basis comparison table is for grasping the degree of improvement by comparison with the preceding fiscal year.

The matrix-basis ranking table is used to grasp which one of projects, or which one of organizations, is superior or inferior and thereby find where to improve, and to expand the superior points to the other organizations. The inter-measurement item relation graph can be used to, for example, find and evaluate a productivity prediction formula by analyzing the scale-cost correlation, and to find and evaluate a product scale prediction formula by analyzing the scale correlation between a superordinate product and a subordinate product. Since the actual performance is accumulated project after project in the management data base 3, prediction formulae of progressively higher precision can be created from the accumulated information.

1) Description of Index Value Calculation

The index value calculation is to calculate a cost index. In this embodiment, project-by-project cost index plan values, project-by-project cost index actual performance values, and engineer-by-engineer cost index actual performance values are calculated and stored in a project-by-project cost index TBL.

In calculating a cost index, first, the result of executing basic information editing processing is stored in a cost index standard TBL. Information in the cost index standard TBL is read next to execute remodeling product cost index compiling processing, and the result of the processing is stored in an aggregated cost index standard TBL. Lastly, information in the aggregated cost index standard TBL is read to execute product-by-product cost index compiling processing, and the result of the processing is stored in a project-by-project cost index standard TBL.

In the basic information editing processing, quantity-based cost calculation is performed first, in which the individual-by-individual, project-by-project, and secondary activity-by-secondary activity labor costs are read out of the person-by-person actual man-hour performance TBL, and counted up for each combination of a system ID, a development unit ID, a project ID, an integration unit ID, and a product ID. Next, ultimately realized scales are read out of the actual production scale performance TBL, and counted up for each same combination of a system ID, a development unit ID, a project ID, an integration unit ID, and a product ID. The quantity-based cost is calculated by dividing the aggregated labor cost value by the aggregated ultimately realized scale value.

Next, a change in productivity due to the development environment characteristic and a change in productivity due to the quality characteristic are eliminated. $\Sigma$ environmental variable influence rate is read out of an actual integration performance secondary activity TBL, and the quantity-based cost is divided by ($1+\Sigma$ environmental variable influence rate) to obtain a post-environmental variable influence rate elimination quantity-based cost.

Work for creating one product differs from project to project, and influence of this difference is eliminated by converting the quantity-based cost into the quantity-based cost of a case where work is done under the standard activity distribution. In this embodiment, a work operation is identified by a secondary activity ID. The ID of a secondary activity carried out in a project is stored in the actual integration performance secondary activity TBL, and workload ratios are read and counted up for each secondary activity ID registered in this TBL. For instance, when the aggregated workload ratio value is 90%, it means that less work than (only 90% of) the work done under the standard activity distribution has been accomplished.

In a set of standard activity IDs, the aggregated workload ratio value is 100%. The converted quantity-based cost is therefore obtained by dividing the post-environmental variable influence rate elimination quantity-based cost by (aggregated workload ratio value/100).

Next, the actual performance value of the productivity of the project is converted into the actual performance value of the cost index standard. This processing is the reverse of the procedure of converting empirical values of the cost index standard productivity into productivities applied to the development of individual software products. The reverse processing includes reading and counting up specified request workload adjustment coefficients which are stored in the activity-by-activity workload adjustment TBL, reading a specified request scale adjustment coefficient out of the scale adjustment coefficient TBL, dividing the converted quantity-based cost by (specified request scale adjustment coefficient×Σ specified request workload adjustment coefficient) to obtain a cost index standard asset-basis cost, which is stored as a standard asset-basis cost in the cost index standard TBL.

Next, the aggregated ultimately realized scale value which has already been calculated is divided by the specified request scale adjustment coefficient to obtain a cost index standard asset amount. The cost index standard asset amount is stored as a standard asset amount in the cost index standard TBL.

Developing a software product by remodeling an existing software product involves work that is not necessary when developing a software product from the scratch, such as studying the existing software product and making the result of the remodeling reflected on the specification of the existing software product. This embodiment therefore chooses to discriminate a document of the software product to be studied from a document of the existing software as a different product. Accordingly, compared with the case of development of an entirely new software product, there are significantly more types of product.

The cost index standard makes it easy to determine characteristics of individual software products by setting a conversion standard table for products that are created in development of an entirely new software product. Products unique to remodeling development are therefore consolidated to one of products that are created in development of a completely new software product. In this embodiment, information that indicates to which existing product a product unique to remodeling development is consolidated is held in a consolidation destination product association TBL in advance.

In this table, a product ID that does not match any consolidation destination product ID is one that needs to be consolidated, and the standard per-asset cost of this product ID is consolidated to the standard per-asset cost of a consolidation destination product ID. The consolidation is accomplished by: multiplying the standard per-asset cost of the product ID where an increase/decrease in cost due to self-effort has been canceled out by the standard asset amount of the product ID, to thereby calculate a cost; dividing this cost by the standard per-asset cost of the consolidation destination product ID where an increase/decrease in cost due to self-effort has been canceled out, to thereby convert the cost into an asset scale corresponding to the consolidation destination product ID; and storing the scale as a converted standard asset amount in the cost index standard TBL.

Also, a cost calculated by multiplying the standard asset amount of the product ID by the standard per-asset cost of the product ID is divided by the scale of the asset corresponding to the consolidation destination product ID, to thereby obtain a standard per-asset cost corresponding to the consolidation destination product ID. The calculated standard per-asset cost is stored as a converted standard per-asset cost in the cost index standard TBL. In the consolidation destination product association TBL, a product ID that matches a consolidation destination product ID does not need the conversion. Accordingly, the standard asset amount and the standard per-asset cost in the cost index standard TBL are posted to the converted standard asset amount and the converted standard per-asset cost, respectively.

Next, the converted standard asset amount in the cost index standard TBL and a cost that is calculated by multiplying the converted standard asset amount by the converted standard per-asset cost are counted up for each consolidation destination product ID set in the consolidation destination product TBL. The aggregated converted standard asset amount is stored as a standard asset amount in the consolidated cost index standard TBL. A value that is obtained by dividing the aggregated cost of the consolidation destination product ID by the aggregated converted standard asset amount is stored as a standard per-asset cost in the consolidated cost index standard TBL.

Through the above processing, the value of the cost index standard is calculated for each consolidation destination product ID. The product cost index compiling processing is performed next to unify the actual performance of the respective products as the actual development performance of a representative product.

First, a scale conversion rate and a cost component ratio are read out of the development unit cost index standard TBL created in the plan basic information definition. The standard asset amount is read out of the consolidated cost index standard TBL, and multiplied by the scale conversion rate to obtain a software product unit amount estimation value as an estimation value of the scale of the representative product which is associated with the scale of the product ID in question. Next, in order to calculate the contributory share of this product in the final software product, the production scale is obtained by multiplying the software product unit amount estimation value by the cost component ratio. Next, a cost is read by multiplying the standard asset amount in the consolidated cost index standard TBL by the standard per-asset cost. The read cost is divided by the cost component ratio to obtain an overall software product cost estimation value, which is divided by the software product unit amount estimation value to calculate a cost per software product unit amount. Every piece of information has now been converted into the cost index standard of the representative product, and this is consolidated into information for each combination of a system ID, a development unit ID, and a project ID. The result is stored as a cost index and a production scale in the project-by-project cost index standard TBL.

Figure 11:
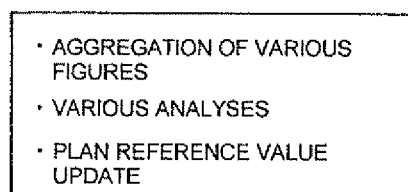
FIG. 11 is a diagram showing processing in Step S8 of the processing flow shown in FIG. 3.

(b) Description of "Plan Reference Value Update Processing" (see FIG. 3 and FIG. 11)

In this embodiment, actual performance information consolidated upon completion of a phase, actual performance information consolidated upon completion of a project, and actual cost index performance information are stored in the management database 3 as a result of the project-by-project consolidation processing, the development unit-by-development unit consolidation processing, and the actual production performance consolidation processing.

Generally speaking, individual projects have varying characteristics, and updating the plan reference value requires to go through a procedure of first grouping together projects that have the same characteristic to statistically analyze the actual performance values of the projects, and then consolidating the values to a superordinate concept thereof. The procedure in this embodiment puts the actual performance of projects through consolidation into client domain-by-client domain actual performance values for analysis, then consolidation into domain-by-domain actual performance values for analysis, and lastly consolidation into company-wide uniform actual performance values for analysis.

Domains are for categorizing the characteristics of individual projects. The characteristic of each domain is identified by an analysis key category ID and an actual performance analysis key ID. These IDs are held in advance in an analysis key category TBL and an actual performance analysis key category TBL.

In each project, an analysis key category ID and an actual performance analysis key category ID are set in association with an integration unit ID, and each project holds a client code in a project TBL. A user can therefore have spreadsheet software or a statistical analysis tool to gather the actual performance of multiple projects that share the same client, the same analysis key category ID, and the same actual performance analysis key category ID, and read the actual performance values of the individual projects to perform various analyses including regression analysis. The extraction of information to be analyzed may utilize the index value reference described in the actual production performance consolidation processing. Based on the results of these analyses, the user updates productivities in the production productivity reference value TBL, which is kept in the management database, and thus updates the plan reference value.

The invention claimed is:

1. A software development production management system having a processor comprising:

a management database which holds development process component data necessary to model a development process of software, and estimation parameter data used to estimate a development plan of the software; and a software development production management device which defines a software development process to be managed by consulting the development process component data held in the management database, and uses the estimation parameter data to create a software development plan from the defined software development process, wherein the software development production management device has a processing means which, upon completion of the software development, compares and evaluates an actually performed development process and the created software development plan, and makes a correction to the estimation parameter data based on results of the comparison and evaluation so that details of the actually conducted software development can be fed back to a development plan for the next time software is developed, wherein the software development production management device includes:

a standard plan integration module which defines the software development process to be managed based on the development process component data, and then creates a standard software development plan containing scales and man-hours of respective work operations in the defined software development process;

an execution plan creating module which assigns the work operations to workers taking into consideration the scales and man-hours of the respective work operations in the standard software development plan, and corrects details of the work operations assigned in accordance with abilities of the respective workers to create an adjusted software development plan;

an actual performance information collecting module which, in developing software in accordance with the adjusted software development plan, collects actual performance information containing actual man-hour performance and actual scale performance, the actual man-hour performance being a man-hour that is actually put in by the respective workers, the actual scale performance being a scale of work that is actually done;

a process completion monitoring module which, upon completion of the software development, evaluates a difference between details of the actually conducted development and the software development plan created in the execution plan creating module in a manner that includes a cause of the difference and quality of the developed software in the evaluation, and feeds results of the evaluation back to an adjustment made by the execution plan creating module; and an individual productivity evaluating module which evaluates information about productivities of the respective workers taking into consideration the actual man-hour performance and the actual scale performance, and feeds results of the evaluation back to an adjustment made by the execution plan creating module, wherein the management database holds, as a productivity empirical value, a labor cost per unit amount of a product, and records a unit labor cost of each employee, and wherein the execution plan creating module calculates productivity of each employee by dividing a product of the productivity empirical value and an actual product amount by the unit labor cost of each employee.

2. A software development production management system as claimed in claim 1, wherein the software development production management device includes an actual production performance evaluating module which performs comparative evaluation between software development plan forming and work according to the formed plan on multiple software development projects to take statistics, and feeds the statistics back to the creation of the standard software development plan in the standard plan integration module.

3. A software development production management system as claimed in claim 2, wherein the management database has given development productivity reference data which is a ratio of a given workload to given product amount, the given workload being a workload in a given software development environment, the given product amount being a product amount in the given software development environment, and wherein the execution plan creating module uses a first comparison coefficient and a second comparison coefficient as tailoring parameters, and calculates development productivity reference data in software development for which a plan is to be formed by an expression "given development productivity reference data×second comparison coefficient/first comparison coefficient", the first comparison coefficient being a ratio of a product amount in an environment of the software development for which a plan is to be formed to the given product amount, the second comparison coefficient being a ratio of a workload in the environment of the software development for which a plan is to be formed to the given workload.

4. A software development production management system as claimed in claim 3,
wherein the management database holds a productivity fluctuation rate which takes into account factors influencing a software development productivity, and
wherein the execution plan creating module calculates a development productivity in the software development for which a plan is to be formed from the development productivity reference data and the productivity fluctuation rate.

5. A software development production management system as claimed in claim 4,
wherein the execution plan creating module keeps track of each specification change made to a software product in terms of a specification change time which is when the specification change is thought to occur, a change added scale which is an amount added due to the specification change, and a change discarded scale which is an amount discarded due to the specification change, and
wherein the change added scale is added to an initial scale and the change discarded scale is subtracted from the initial scale each time the specification change time arrives to calculate an ultimately realized scale which is a scale the software product will have upon completion, the initial scale being a software product scale that is created in the standard plan integration module.

6. A computer program which, when stored in and executed by a computer with a storage device, builds in the storage device a management database for holding development process component data necessary to model a development process of software, and estimation parameter data used to estimate a development plan of the software, and which causes the computer to operate as a software development production management device, the software development production management device defining a software development process to be managed by consulting the development process component data held in the management database, and using the estimation parameter data to create a software development plan from the defined software development process,
wherein the management database holds, as a productivity empirical value, a labor cost per unit amount of a product, and records a unit labor cost of each employee,
wherein the computer program causes the computer:
to form a processing means which, upon completion of the software development, compares and evaluates an actually performed development process and the created software development plan, and makes a correction to the estimation parameter data based on results of the comparison and evaluation so that the computer can feed details of the actually conducted software development back to a development plan for the next time software is developed,
to define the software development process to be managed based on the development process component data, and then creates a standard software development plan containing scales and man-hours of respective work operations in the defined software development process;
to assign the work operations to workers taking into consideration the scales and man-hours of the respective work operations in the standard software development plan, and corrects details of the work operations assigned in accordance with abilities of the respective workers to create an adjusted software development plan;
to collect, in developing software in accordance with the adjusted software development plan, actual performance information containing actual man-hour performance and actual scale performance, the actual man-hour performance being a man-hour that is actually put in by the respective workers, the actual scale performance being a scale of work that is actually done;
to evaluate, upon completion of the software development, a difference between details of the actually conducted development and the software development plan created in the execution plan creating module in a manner that includes a cause of the difference and quality of the developed software in the evaluation, and feeds results of the evaluation back to an adjustment made by the execution plan creating module; and
to evaluate information about productivities of the respective workers taking into consideration the actual man-hour performance and the actual scale performance, and feeds results of the evaluation back to an adjustment made by the execution plan creating module,
to calculate productivity of each employee by dividing a product of the productivity empirical value and an actual product amount by the unit labor cost of each employee.

7. A computer-readable recording medium which records the computer program as claimed in claim 6.

* * * * *